United States Patent
Johnson

(10) Patent No.: US 6,839,544 B1
(45) Date of Patent: Jan. 4, 2005

(54) SYSTEM AND METHOD FOR REMOTE MONITORING OF A TRANSMITTER IN A WIRELESS BASE STATION

(75) Inventor: Mitchell K. Johnson, McKinney, TX (US)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/420,308

(22) Filed: Oct. 18, 1999

(51) Int. Cl.[7] .............................................. H04B 17/00
(52) U.S. Cl. .................... 455/67.11; 455/423; 455/424; 455/425; 455/14; 455/522; 455/523; 455/67.11; 455/67.12; 455/67.13; 455/67.14; 455/67.15; 455/67.16; 455/67.7; 455/432; 455/422.1; 370/241
(58) Field of Search .............................. 455/423, 424, 455/425, 14, 523, 67.11, 67.12, 437, 67.13, 67.14, 67.15, 67.16, 67.7, 422.1, 561; 370/241

(56) References Cited

U.S. PATENT DOCUMENTS

| | | | | |
|---|---|---|---|---|
| 5,423,071 A | * | 6/1995 | Hanninen ................... 359/145 |
| 5,555,260 A | * | 9/1996 | Rinnback et al. ........... 370/347 |
| 5,604,728 A | * | 2/1997 | Jylha .......................... 370/241 |
| 5,852,651 A | * | 12/1998 | Fischer et al. .............. 359/152 |
| 5,890,056 A | * | 3/1999 | Garner et al. ............ 455/67.11 |
| 6,108,525 A | * | 8/2000 | Takemura .................. 455/67.4 |
| 6,259,910 B1 | * | 7/2001 | Fairfield et al. ............ 455/422 |
| 6,529,733 B1 | * | 3/2003 | Qing-An ..................... 455/437 |

* cited by examiner

Primary Examiner—David Hudspeth
Assistant Examiner—David Nguyen

(57) ABSTRACT

There is disclosed a signal monitoring apparatus for use in a wireless network base station containing a modular main unit for processing baseband signals and a modular radio unit separate from the main unit for transmitting and receiving radio frequency (RF) signals. The signal monitoring apparatus is disposed in the radio unit and monitors an RF output signal transmitted by a transceiver in the radio unit. The signal monitoring apparatus comprises an RF mixer that mixes the RF output signal and receiver local oscillator (LO) signal used by the receiver portion of the transceiver to demodulate received RF signals. The RF mixer generates an intermediate frequency (IF) signal capable of being transmitted through a communication line at relatively low signal loss to a signal measuring device located in the main unit or elsewhere.

20 Claims, 4 Drawing Sheets

SYSTEM AND METHOD FOR REMOTE MONITORING OF A TRANSMITTER IN A WIRELESS BASE STATION

TECHNICAL FIELD OF THE INVENTION

The present invention is directed, in general, to wireless communications systems and, more specifically, to a system for monitoring the RF output power of a base station in a wireless communication network.

BACKGROUND OF THE INVENTION

Wireless communications systems, including cellular phones, paging devices, personal communication services (PCS) systems, and wireless data networks, have become ubiquitous in society. Wireless service providers continually try to create new markets for wireless devices and to expand existing markets by making wireless devices and services cheaper and more reliable. The price of end-user wireless devices, such as cell phones, pagers, PCS systems, and wireless modems, has been driven down to the point where these devices are affordable to nearly everyone and the price of a wireless device is only a small part of the end-user's total cost. To continue to attract new customers, wireless service providers concentrate on reducing infrastructure costs and operating costs while improving quality of service in order to make wireless services cheaper and better.

In order to increase the number of subscribers that can be serviced in a single wireless network, frequency reuse is maximized by making individual cell sites smaller and using a greater number of cell sites to cover the same geographical area. Accordingly, the greater number of base stations increases infrastructure costs, operating costs, and maintenance costs. To offset this increased cost, wireless service providers are eager to implement any innovations that may reduce equipment costs, maintenance and repair costs, and operating costs, or that may increase service quality.

The ability to remotely monitor the RF signals transmitted by the base stations in a wireless network is one important way to maintain a high level of service quality and to reduce maintenance costs. Among the signal parameters that may be remotely monitored are adjacent channel power ratio (ACPR), spectral purity (including in-band and out-of-band spurious components), occupied bandwidth, RHO, frequency error, and code domain power. By remotely monitoring the RF transmitters of a base station from a central location, a wireless service provider can avoid the expense of sending maintenance crews out into the field to test RF transmitters individually. Additionally, a remote monitoring system can detect the failure of an RF transmitter nearly instantaneously.

Conventional wireless networks contain "integrated" base stations in which RF (or radio) functions and non-RF (non-radio) functions are performed within the same physical assembly. RF functions include the transmission, reception, modulation, demodulation, amplification, and filtering of inbound and outbound signals. Non-RF functions include signal processing and switching of low-frequency signals, such as baseband and intermediate frequency (IF) signals. In integrated base stations, the RF signal transmitted by the base station may be directly monitored by built-in test equipment, such as a dedicated test equipment circuit board, installed in the chassis of the base station. The measured RF signal parameters may then be transmitted to a central monitoring facility, such as a mobile switching center, along with the normal voice and data traffic associated with the calls handled by base station.

Recently, however, base stations have been implemented in modular and distributed architectures, rather than as integrated units. In some modular and distributed designs, RF functions are implemented in one module and non-RF functions are implemented in a separate module remote from the RF functions module. One such modular and distributed base station was disclosed in U.S. Provisional Patent Application Ser. No. 60/058228, filed on Sep. 9, 1997, and in U.S. patent application Ser. No. 09/149,168, filed on Sep. 8, 1998, both of which are assigned to Samsung Electronics Co., Ltd., the assignee of the present application. The teachings of U.S. Provisional Patent Application Ser. No. 60/058228 and U.S. patent application Ser. No. 09/149,168 are hereby incorporated by reference into the present application as if fully set forth herein. The Pico-BTS™ system provided by Samsung Electronics Corporation incorporates a modular and distributed base station design in which RF functions are implemented in a radio unit (RU) and non-RF functions are implemented in a separate main unit (MU).

The advantages of a modular and distributed design are many. This design results in a compact RU unit that can be mounted close to the antennas, thereby greatly reducing cable losses in the inbound and outbound RF signals. The separation of RF and non-RF elements results in easier adaption of the modular and distributed design to different RF operating conditions. If the radio unit is upgraded or replaced, it is not necessary to simultaneously upgrade or replace the main unit, and vice versa. For example, if a single non-radio main unit supports three radio units in a three sector antenna system and the main unit is replaced in order to upgrade the signal processing capability of the main unit, the three radio units are not affected. In an integrated base station, the radio units would be discarded along with the outdated main unit.

However, a modular and distributed architecture makes it more difficult to monitor the RF signals transmitted by the radio unit. If the RF test equipment is part of a non-radio main unit, then the RF signal from each radio unit served by the main unit must be forced through a high loss coaxial cable in order to reach the main unit, which makes signal measurements much less accurate. Alternatively, if the RF test equipment is part of the radio unit, then separate RF test equipment must be installed in each radio unit attached to the main unit, which results in redundant test equipment and increased cost.

There is therefore a need in the art for systems and methods for monitoring the RF signals transmitted from one or more radio units in modular and distributed base stations in a wireless network. In particular, there is a need for systems and methods for monitoring the RF signals transmitted by modular radio units that minimizes the amount of test equipment needed without routing the transmitted RF signals through "lossy" cables that reduce the accuracy of signal measurements.

SUMMARY OF THE INVENTION

To address the above-discussed deficiencies of the prior art, it is a primary object of the present invention to provide a signal monitoring apparatus for use in a wireless network base station comprising a main unit capable of processing baseband signals and a radio unit separate from the main unit capable of transmitting and receiving radio frequency (RF) signals. In an advantageous embodiment, the signal monitoring apparatus is disposed in the radio unit and monitors an RF output signal transmitted by a transceiver in the radio unit and comprises an RF mixer having a first input capable of receiving the RF output signal and a second input capable of receiving a first local oscillator reference signal used by a receiver portion of the transceiver to demodulate received RF signals, wherein the RF mixer generates on an output of the RF mixer an intermediate frequency (IF) signal capable of being transmitted through a communication line at relatively low signal loss to a signal measuring device.

In one embodiment of the present invention, the signal monitoring apparatus further comprises: 1) an analog-to-digital (ADC) converter capable of digitizing the IF signal; and 2) an interface transmitter capable of transmitting the digitized IF signal to the signal measuring device.

In another embodiment of the present invention, the interface transmitter is an optical transmitter.

In still another embodiment of the present invention, the main unit comprises a stable reference clock generator capable of transmitting a clock signal to the radio unit on the communication line.

In yet another embodiment of the present invention, the signal monitoring apparatus further comprises: 1) a first filter for coupling an output of the RF mixer to the communication line, wherein the first filter isolates the RF mixer output from the clock signal; and 2) a second filter for coupling at least one component in the radio unit requiring the clock signal to the communication line, wherein the second filter isolates the at least one component from the IF signal.

In a further embodiment of the present invention, the signal monitoring apparatus further comprises a third filter for coupling an output of the stable clock reference generator to the communication line, wherein the third filter isolates the stable clock reference generator from the IF signal.

In a still further embodiment of the present invention, the signal monitoring apparatus further comprises a fourth filter for coupling the signal measuring device to the communication line, wherein the fourth filter isolates the signal measuring device from the clock signal.

In a yet further embodiment of the present invention, the clock-signal operates at a frequency lower that the IF signal and the first and fourth filters are high-pass filters and the second and third filter are low-pass filters.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless network.

Figure 1:
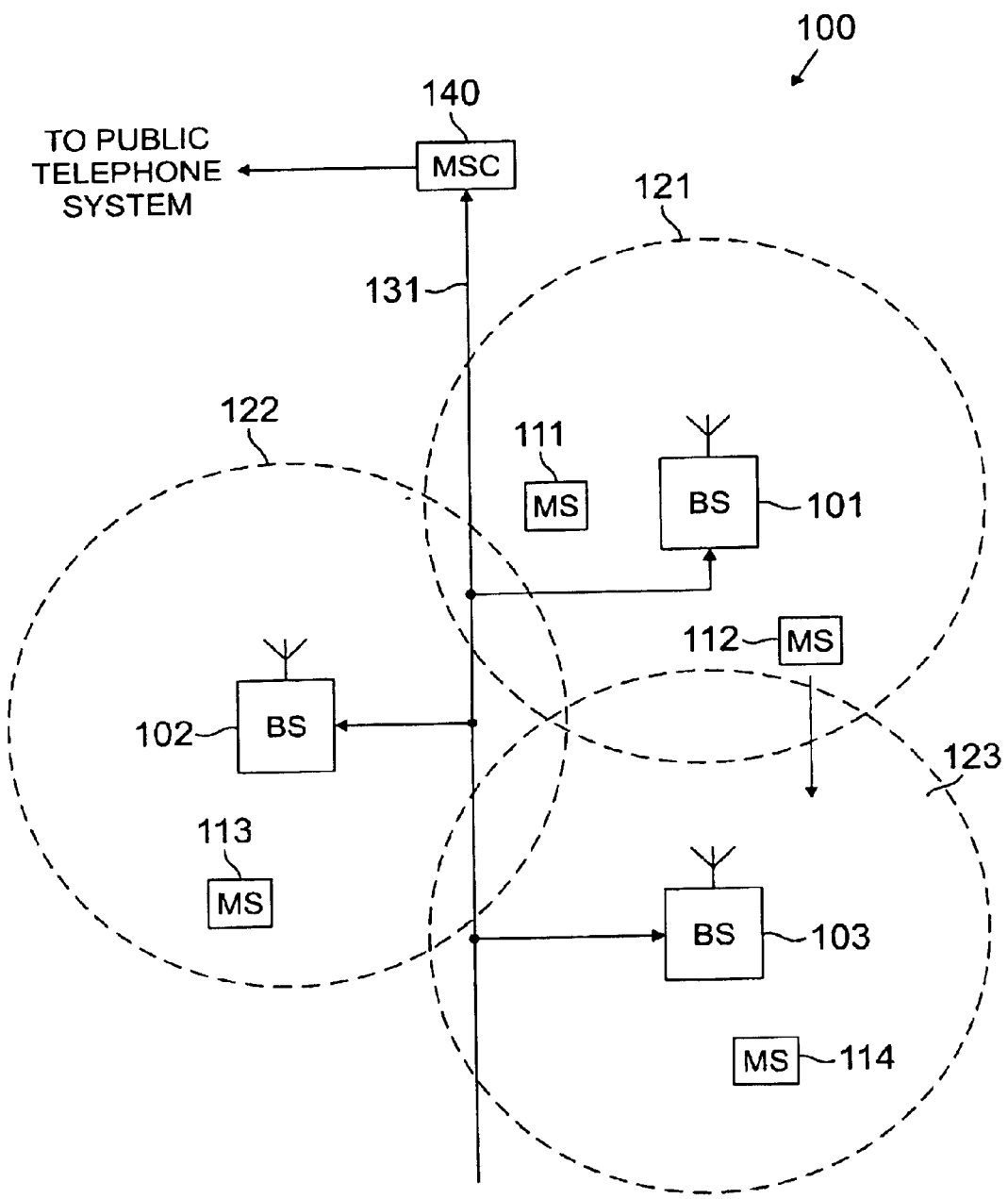
FIG. 1 illustrates an exemplary wireless network according to one embodiment of the present invention.

FIG. 1 illustrates an exemplary wireless network 100 according to one embodiment of the present invention. The wireless telephone network 100 comprises a plurality of cell sites 121–123, each containing one of the base stations, BS 101, BS 102, or BS 103. Base stations 101–103 are operable to communicate with a plurality of mobile stations (MS) 111–114. Mobile stations 111–114 may be any suitable cellular devices, including conventional cellular telephones, PCS handset devices, portable computers, metering devices, and the like.

Dotted lines show the approximate boundaries of the cell sites 121–123 in which base stations 101–103 are located. The cell sites are shown approximately circular for the purposes of illustration and explanation only. It should be clearly understood that the cell sites also may have irregular shapes, depending on the cell configuration selected and natural and man-made obstructions.

In one embodiment of the present invention, BS 101, BS 102, and BS 103 may comprise a base station controller (BSC) and a base transceiver station (BTS). Base station controllers and base transceiver stations are well known to those skilled in the art. A base station controller is a device that manages wireless communications resources, including the base transceiver station, for specified cells within a wireless-communications network. A base transceiver station comprises the RF transceivers, antennas, and other electrical equipment located in each cell site. This equipment may include air conditioning units, heating units, electrical supplies, telephone line interfaces, and RF transmitters and RF receivers, as well as call processing circuitry. For the purpose of simplicity and clarity in explaining the operation of the present invention, the base transceiver station in each of cells 121, 122, and 123 and the base station controller associated with each base transceiver station are collectively represented by BS 101, BS 102 and BS 103, respectively.

BS 101, BS 102 and BS 103 transfer voice and data signals between each other and the public telephone system (not shown) via communications line 131 and mobile switching center (MSC) 140. Mobile switching center 140 is well known to those skilled in the art. Mobile switching center 140 is a switching device that provides services and coordination between the subscribers in a wireless network and external networks, such as the public telephone system. Communications line 131 may be any suitable connection means, including a T1 line, a T3 line, a fiber optic link, a network backbone connection, and the like. In some embodiments of the present invention, communications line 131 may be several different data links, where each data link couples one of BS 101, BS 102, or BS 103 to MSC 140.

In the exemplary wireless network 100, MS 111 is located in cell site 121 and is in communication with BS 101, MS 113 is located in cell site 122 and is in communication with BS 102, and MS 114 is located in cell site 123 and is in communication with BS 103. MS 112 is also located in cell site 121, close to the edge of cell site 123. The direction arrow proximate MS 112 indicates the movement of MS 112 towards cell site 123. At some point, as MS 112 moves into cell site 123 and out of cell site 121, a "handoff" will occur.

As is well known, the "handoff" procedure transfers control of a call from a first cell to a second cell. For example, if MS 112 is in communication with BS 101 and senses that the signal from BS 101 is becoming unacceptably weak, MS 112 may then switch to a BS that has a stronger signal, such as the signal transmitted by BS 103. MS 112 and BS 103 establish a new communication link and a signal is sent to BS 101 and the public telephone network to transfer the on-going voice, data, or control signals through BS 103. The call is thereby seamlessly transferred from BS 101 to BS 103. An "idle" handoff is a handoff between cells of a mobile device that is communicating in the control or paging channel, rather than transmitting voice and/or data signals in the regular traffic channels.

Figure 2:
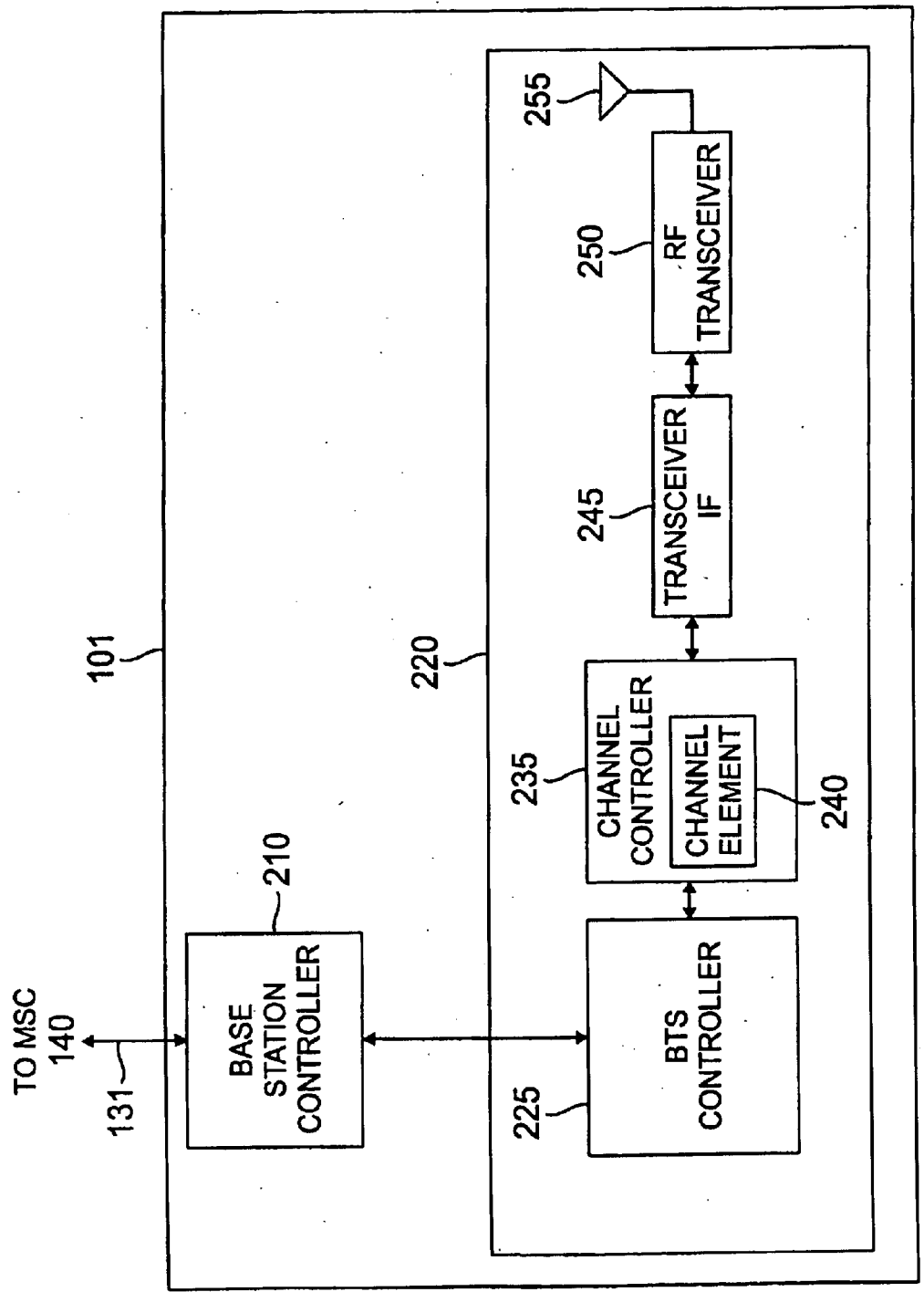
FIG. 2 illustrates in greater detail an exemplary base station in accordance with one embodiment of the present invention.

FIG. 2 illustrates in greater detail exemplary base station 101 in accordance with one embodiment of the present invention. Base station 101 comprises base station controller (BSC) 210 and base transceiver station (BTS) 220. Base station controllers and base transceiver stations were described previously in connection with FIG. 1. BSC 210 manages the resources in cell site 121, including BTS 220. BTS 220 comprises BTS controller 225, channel controller 235, which contains representative channel element 240, transceiver interface (IF) 245, RF transceiver unit 250, and antenna array 255.

BTS controller 225 comprises processing circuitry and memory capable of executing an operating program that controls the overall operation of BTS 220 and communicates with BSC 210. Under normal conditions, BTS controller 225 directs the operation of channel controller 235, which contains a number of channel elements, including channel element 240, that perform bi-directional communications in the forward channel and the reverse channel. A "forward" channel refers to outbound signals from the base station to the mobile station and a "reverse" channel refers to inbound signals from the mobile station to the base station. In an advantageous embodiment of the present invention, the channel elements communicate according to a code division multiple access (CDMA) protocol with the mobile stations in cell 121. Transceiver IF 245 transfers the bi-directional channel signals between channel controller 240 and RF transceiver unit 250.

Antenna array 255 transmits forward channel signals received from RF transceiver unit 250 to mobile stations in the coverage area of BS 101. Antenna array 255 also sends to transceiver 250 reverse channel signals received from mobile stations in the coverage area of BS 101. In a preferred embodiment of the present invention, antenna array 255 is a multi-sector antenna, such as a three sector antenna in which each antenna sector is responsible for transmitting and receiving in a 120° arc of coverage area.

Additionally, RF transceiver 250 may contain an antenna selection unit to select among different antennas in antenna array 255 during both transmit and receive operations.

In an advantageous embodiment, RF transceiver unit 250 is implemented as one or more modular radio unit(s) mounted at the top of a utility pole close to antenna array 255, thereby minimizing RF signal losses in lengthy cables. Additionally, transceiver IF 245 and the remainder of BTS .220 are implemented as at least one modular non-radio unit(s) located at a position remote from modular RF transceiver unit 250, such as at the bottom of the utility pole. The present invention provides means for performing test measurements on the RF output signal transmitted by RF transceiver unit 250 without adding test equipment to each modular radio unit mounted atop the utility pole and without driving the RF output signal through a lengthy, high-loss coaxial cable. The present invention thereby avoids adding weight, size, complexity, and expense to each radio unit.

Figure 3:
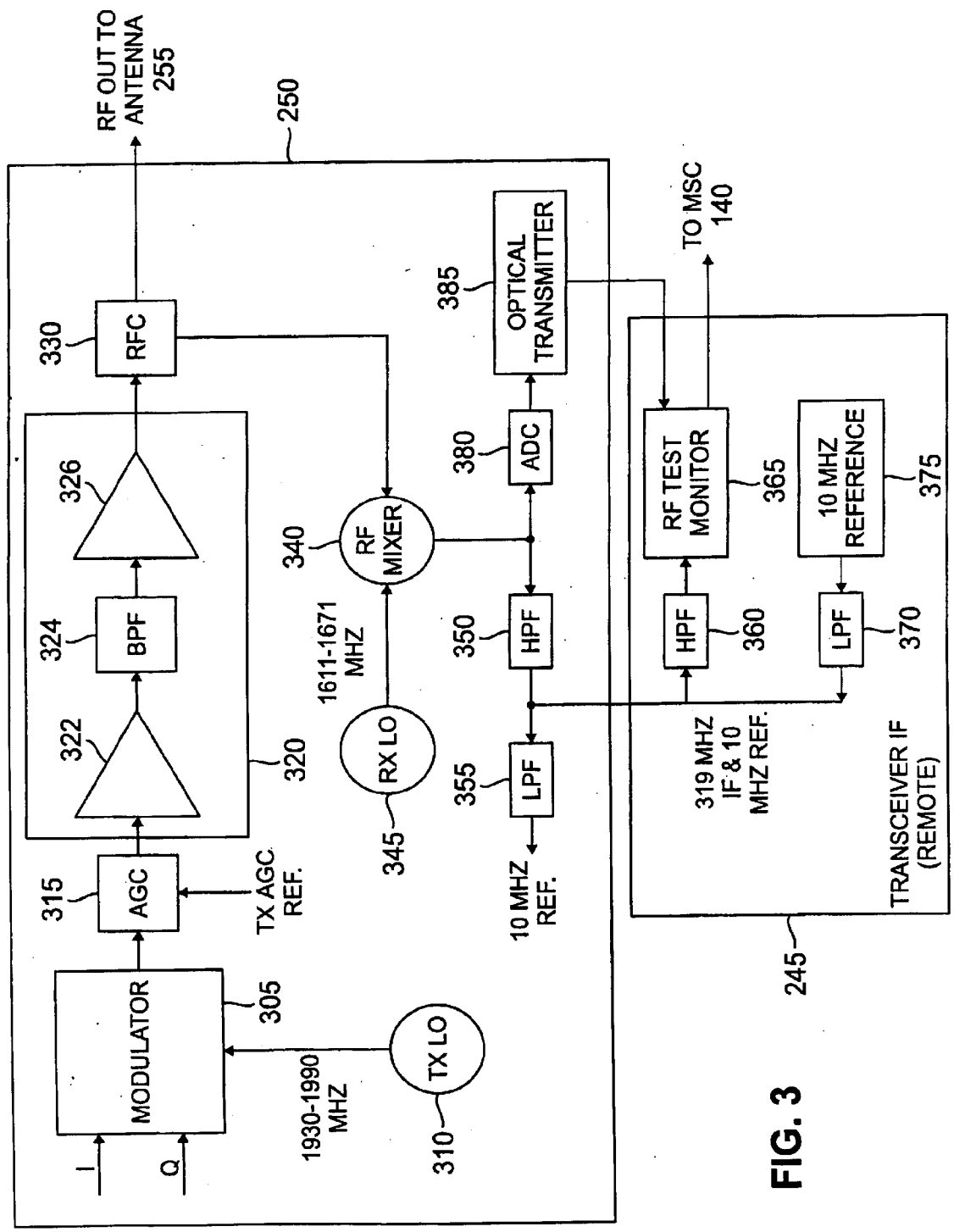
FIG. 3 illustrates in greater detail an exemplary RF transceiver and an exemplary transceiver interface in accordance with one embodiment of the present invention.

FIG. 3 illustrates in greater detail exemplary RF transceiver unit 250 and exemplary transceiver interface (IF) 245 in accordance with one embodiment of the present invention. The transmit portion of exemplary RF transceiver unit 250 comprises modulator 305, transmit local oscillator (TX LO) 310, automatic gain control (AGC) 315, amplifier circuit 320, and RF coupler (RFC) 330, which send the amplified RF output signal to antenna array 255. RF transceiver unit 250 also comprises RF mixer 340, receiver local oscillator (RX LO) 345, high pass filter (HPF) 350 and, optionally, analog-to-digital converter (ADC) 380 and optical transmitter 385.

Modulator 305 accepts baseband quadrature (Q) and in-phase (I) signals from, for example, channel element 240 and modulates the baseband signals with a carrier signal generated by TX LO 310. TX LO 310 generates a stable single frequency output at a system-defined frequency somewhere in the 1930–1990 MHz range, providing the RF carrier frequency for exemplary CDMA transmissions. In one embodiment, TX LO 310 is produced by a phase-locked loop (not shown) that uses the 10 MHz reference signal from low-pass filter (LPF) 355 to produce the stable RF carrier signal.

Next, AGC 315 adjusts the amplitude of the combined modulated RF output from modulator 305 under control of a transmitter automatic gain control reference (TX AGC REF.) signal. The amplitude-adjusted output of AGC 315 is then amplified by amplifier circuit 320 to the required RF output power levels for transmission within the cell site. In an exemplary embodiment, amplifier circuit 320 comprises first power amplifier 322, bandpass filter (BPF) 324, and second power amplifier 326. Amplifier 322 amplifies the output of AGC 315 to an intermediate power level. BPF 324 filters the amplified outbound RF transmission signal so that any spurious signals outside of the desired transmission frequency band are reduced or eliminated. Power amplifier 326 then amplifies the filtered outbound signal to the level required for the targeted cell site.

RFC 330 provides the necessary coupling function to transfer the outbound signal to antenna array 255 and to produce a copy of the transmitted RF signal for testing purposes. In an exemplary embodiment of the present invention, the transmitted CDMA signal has a frequency range of X MHz +/−0.625 MHz, where X represents the carrier frequency. For example, RF transceiver 250 may transmit a CDMA signal with a 1960.625–1961.875 MHz (1961.25 MHz +/−0.625 MHz) frequency range, where 1961.25 MHz represents the carrier frequency from TX LO 310.

RF mixer 340 mixes the RF test signal from the output of RFC 330 with the 1611–1671 MHz reference signal from RX LO 345 to produce a down-converted intermediate frequency signal centered at 319 MHz signal for transfer to transceiver IF 245. The 319 MHz IF signal has the same +/−0.625 MHZ spread spectrum signal as the transmitted RF signal.

RX LO 345 generates a stable single frequency in the 1611–1671 MHz frequency range. In one embodiment of the present invention, RX LO 345 is produced by a phase-locked loop that uses 10 MHz reference signal from LPF 355 to produce the stable RF receiver frequency. In a typical CDMA system, RF transceiver 250 transmits at a frequency that is 80 MHz higher that the receiver operating frequency. RX LO 345 provides a reference signal that is 239 MHz lower than the receiver operating frequency (or 319 MHz lower than the TX LO 310 reference signal). Thus, down-converting the transmitted RF signal by mixing with the RX LO 345 output results in a 319 MHz IF signal. As noted, the 319 MHz IF signal generated by RF mixer 340 effectively represents the RF output signal shifted down (or down-converted) from, for example, an exemplary 1961.25 MHz center frequency to a 319 MHz center frequency. Thus, RF mixer 345 provides an IF output signal which reflects the characteristics of the actual RF output signal and which may be used for analysis by non-RF test measurement circuits.

HPF 350 receives the 319 MHz IF signal from RF mixer 340 and couples this signal to a common communication line that also carries a 10 MHz reference signal generated by remotely located transceiver IF 245. HPF 350 prevents lower frequencies, such as the 10 MHz reference clock frequency produced by transceiver IF 245, from entering RF mixer 340 output. Similarly, LPF 355 filters out the 319 MHz IF signals from HPF 350 and allows the 10 MHz reference to be used by TX LO 310 and RX LO 345.

Optional ADC 380 digitizes the 319 MHz IF signal to provide a digital output representing the RF output signal. Optional optical transmitter 385 converts the digitized representation of the RF output signal to light waves for transfer through optical medium, such as fiber optic cables, to devices such as the optical interface for RF test monitor 365.

Exemplary transceiver IF 245 comprises high pass filter (HPF) 360, RF test monitor 365, low pass filter (LPF) 370, and 10 MHz reference source 375. Typically, transceiver IF 245 is located less than 350 feet from RF transceiver unit 250 and no more than 30 dB is lost in the line between the two using the 319 MHz IF signal. Furthermore, the 319 MHz IF signal that reaches RF test monitor 365 ideally has a dynamic range of at least 60 dB for viable signal measurements. HPF 360 filters out the 10 MHz reference signal on its input and allows only the 319 MHz IF signal to reach RF test monitor 365.

RF test monitor 365 receives the 319 MHZ IF signal from HPF 360 or, optionally, the digitized representation from optical transmitter 385 and performs various tests on the signals.

Representative tests include, but are not limited to, measurements of adjacent channel power ratio, spectral purity, occupied bandwidth, RHO, frequency error, and code domain power. RF test monitor 365 provides outputs representing the results of the various tests for use by MSC 140.

LPF 370 isolates the output of the 10 MHz reference circuit 375 from the 319 MHz IF signal, while allowing the 10 MHz reference signal to pass through. Typically, 10 MHz reference circuit 375 generates the 10 MHz reference clock signal from an extremely accurate and stable global positioning system (GPS) reference clock signal.

Figure 4:
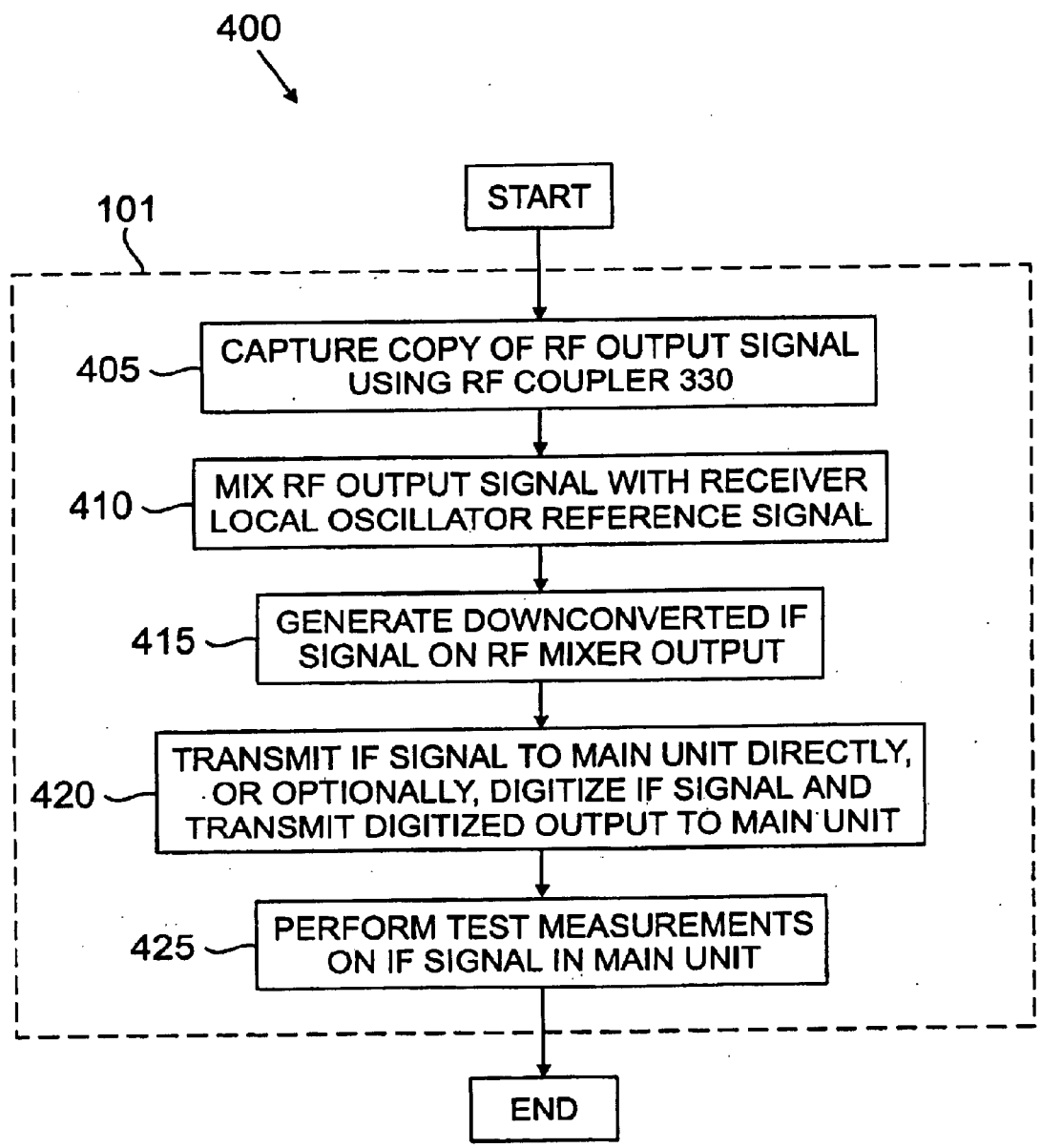
FIG. 4 is a flow diagram illustrating the operation of the exemplary base station in accordance with one embodiment of the present invention.

FIG. 4 is a flow diagram illustrating the operation of the exemplary base station 101 in accordance with one embodiment of the present invention. RFC 330 captures a copy of the RF output signal sent to antenna 350 for use by RF mixer 340 (process step 405). RF mixer 340 mixes the RF output signal captured by RFC 330 with the receiver reference signal in the 1611–1671 frequency range provided by RX LO 345 (process step 410). On its output, RF mixer 340 generates a down-converted 319 MHz IF signal proportional to the RF output signal (process step 415).

RF transceiver 250 transmits the resultant 319 MHz IF signal directly to the transceiver IF 245 (through HPF 350) in the main unit, or digitizes the 319 MHz IF signal using ADC 380 and then uses optical transmitter 385 to transmit the digitized signal to the remotely located main unit (process step 420). Test monitor 365 subsequently performs test measurements on the received IF signal or on the digitized representation of this signal (process step 425). The test results provide a characterization of the RF output signal sent to antenna array 255.

Although the present invention has been described in detail, those skilled in the art should understand that they can make various changes, substitutions and alterations herein without departing from the spirit and scope of the invention in its broadest form.

What is claimed is:

1. For use in a wireless network base station comprising a main unit capable of processing baseband signals and a radio unit separate from said main unit capable of transmitting and receiving radio frequency (RF) signals, a signal monitoring apparatus disposed in said radio unit for monitoring an RF output signal generated by transmission path circuitry in said radio unit comprising:

an RF mixer having a first input capable of receiving said RF output signal and a second input capable of receiving a first local oscillator reference signal used by a receiver portion of said radio unit to demodulate received RF signals, wherein said RF mixer generates on an output of said RF mixer an intermediate frequency (IF) signal capable of being transmitted through a communication line to a test monitor disposed in said main unit.

2. The signal monitoring apparatus set forth in claim 1 further comprising:

an analog-to-digital (ADC) converter capable of digitizing said IF signal; and an interface transmitter capable of transmitting said digitized IF signal to said test monitor.

3. The signal monitoring apparatus set forth in claim 2 wherein said interface transmitter is an optical transmitter.

4. The signal monitoring apparatus set forth in claim 1 wherein said main unit comprises a stable reference clock generator capable of transmitting a clock signal to said radio unit on said communication line.

5. The signal monitoring apparatus set forth in claim 4 further comprising:

a first filter for coupling an output of said RF mixer to said communication line, wherein said first filter isolates said RF mixer output from said clock signal; and a second filter for coupling at least one component in said radio unit requiring said clock signal to said communication line, wherein said second filter isolates said at least one component from said IF signal.

6. The signal monitoring apparatus set forth in claim 5 further comprising a third filter for coupling an output of said stable clock reference generator to said communication line, wherein said third filter isolates said stable clock reference generator from said IF signal.

7. The signal monitoring apparatus set forth in claim 6 further comprising a fourth filter for coupling said test monitor to said communication line, wherein said fourth filter isolates said test monitor from said clock signal.

8. The signal monitoring apparatus set forth in claim 7 wherein said clock signal operates at a frequency lower that said IF signal and said first and fourth filters are high-pass filters and said second and third filter are low-pass filters.

9. A base station for use in a wireless network comprising:

a main unit capable of processing baseband signals:

a radio unit separate from said main unit capable of transmitting and receiving radio frequency (RF) signals; and a signal monitoring apparatus disposed in said radio unit for monitoring an RF output signal generated by transmission path circuitry in said radio unit, said signal monitoring apparatus comprising an RF mixer having a first input capable of receiving said RF output signal and a second input capable of receiving a first local oscillator reference signal used by a receiver portion of said radio unit to demodulate received RF signals, wherein said RF mixer generates on an output of said RF mixer an intermediate frequency (IF) signal capable of being transmitted through a communication line to a test monitor disposed in said main unit.

10. The base station set forth in claim 9 further comprising:

an analog-to-digital (ADC) converter capable of digitizing said IF signal; and an interface transmitter capable of transmitting said digitized IF signal to said test monitor.

11. The base station set forth in claim 10 wherein said interface transmitter is an optical transmitter.

12. The base station set forth in claim 9 wherein said main unit comprises a stable reference clock generator capable of transmitting a clock signal to said radio unit on said communication line.

13. The base station set forth in claim 12 further comprising:

a first filter for coupling an output of said RF mixer to said communication line, wherein said first filter isolates said RF mixer output from said clock signal; and a second filter for coupling at least one component in said radio unit requiring said clock signal to said communication line, wherein said second filter isolates said at least one component from said IF signal.

14. The base station set forth in claim 13 further comprising a third filter for coupling an output of said stable clock reference generator to said communication line, wherein said third filter isolates said stable clock reference generator from said IF signal.

15. The base station set forth in claim 14 further comprising a fourth filter for coupling said test monitor to said communication line, wherein said fourth filter isolates said test monitor from said clock signal.

16. The base station set forth in claim 15 wherein said clock signal operates at a frequency lower that said IF signal and said first and fourth filters are high-pass filters and said second and third filter are low-pass filters.

17. For use in a wireless network base station comprising a main unit capable of processing baseband signals and a radio unit separate from the main unit capable of transmitting and receiving radio frequency (RF) signals, a method for monitoring an RF output signal generated by a transmission path circuitry in the radio unit comprising the steps of:

mixing in an RF mixer disposed in said radio unit the RF output signal and a first local oscillator reference signal used by a receiver portion of the radio unit to demodulate received RF signals;

generating on an output of the RF mixer an intermediate frequency (IF) signal; and transmitting the IF signal through a communication line to a test monitor disposed in said main unit.

18. The method set forth in claim 17 wherein the step of transmitting the IF signal comprises the steps of converting the IF signal to a digital signal and transmitting the digitized IF signal to the test monitor.

19. The method set forth in claim 18 wherein the step of transmitting the digitized IF signal comprises the step of converting the digitized IF signal to an optical signal and transmitting the optical signal to the test monitor.

20. The method set forth in claim 19 wherein the communication line is used to transmit a clock reference signal from the main unit to the radio unit.

* * * * *